INVENTOR
DAVID REGINALD DAVIES
Norris & Bateman
ATTORNEYS

INVENTOR
DAVID REGINALD DAVIES
Norris & Bateman
ATTORNEYS

Nov. 27, 1962 D. R. DAVIES 3,066,089
MECHANICAL HANDLING APPARATUS FOR LOADING AND UNLOADING
HETEROGENEOUS NUCLEAR FUEL REACTIONS
Filed Sept. 10, 1957 6 Sheets-Sheet 3

INVENTOR
DAVID REGINALD DAVIES
Norris & Bateman
ATTORNEYS

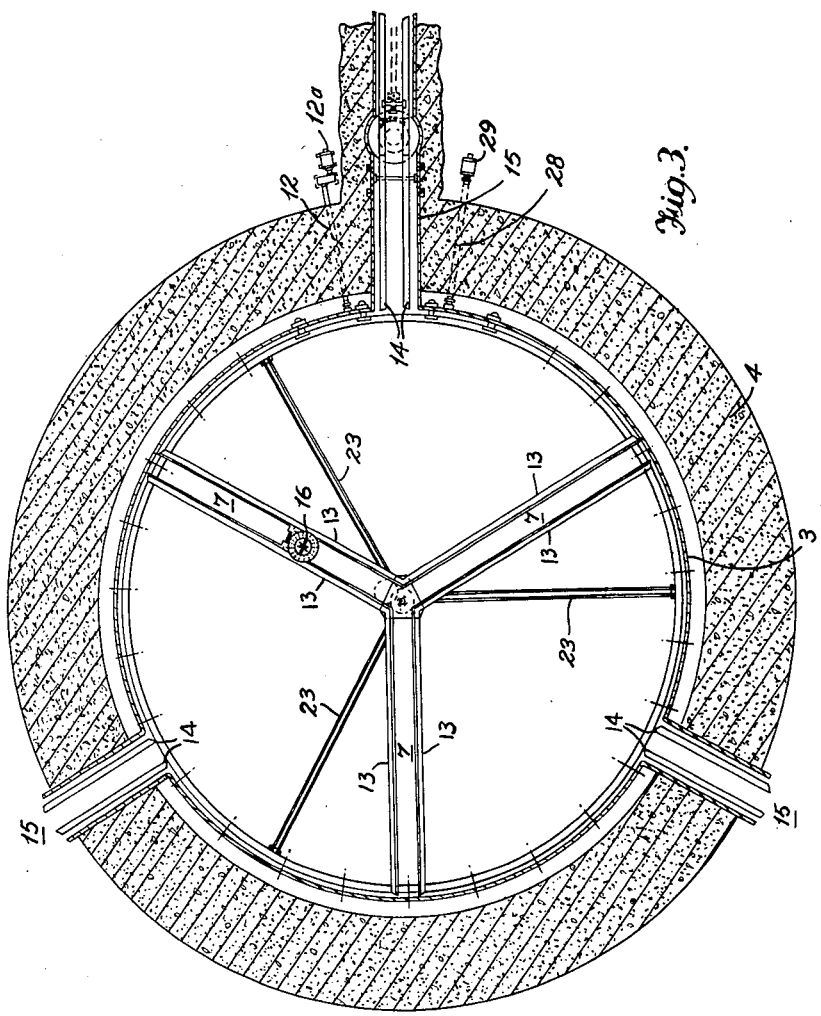

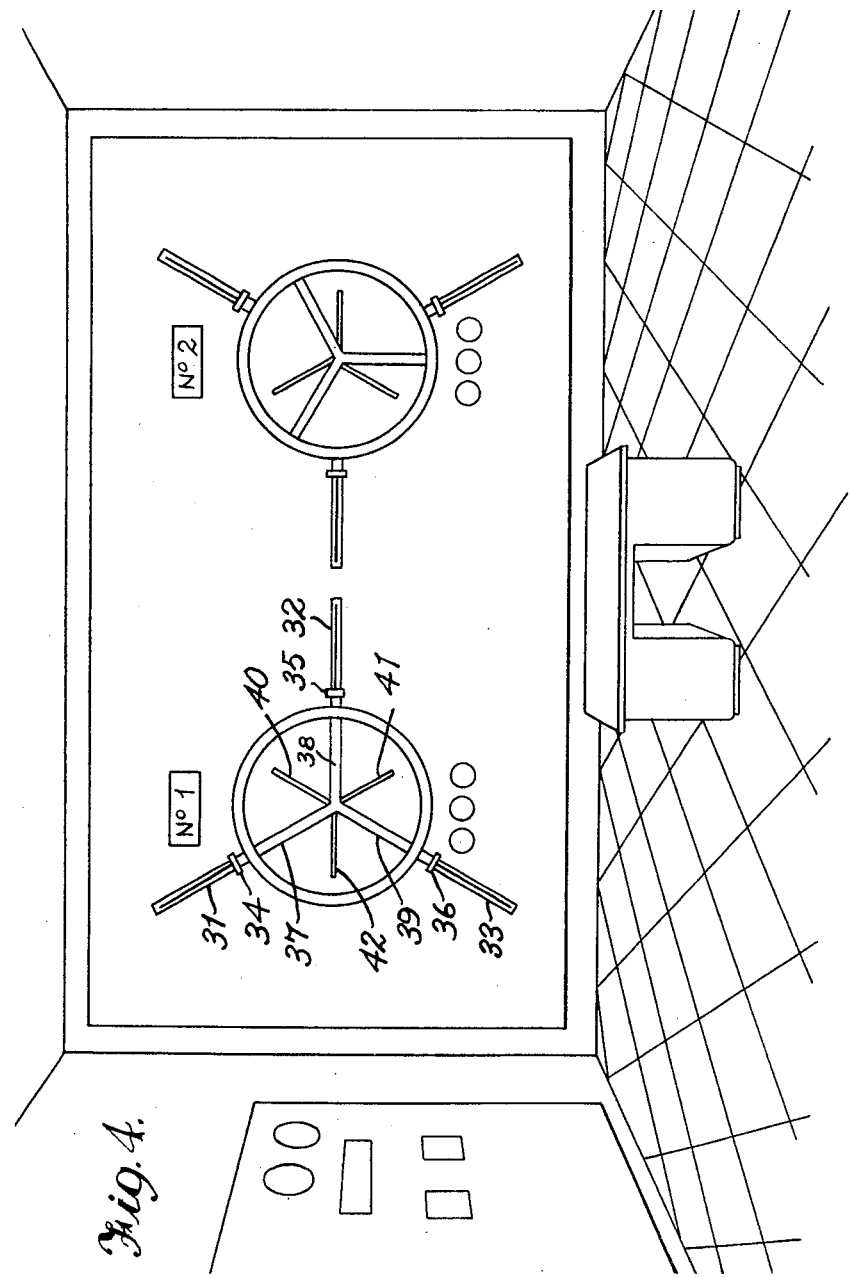

United States Patent Office 3,066,089
Patented Nov. 27, 1962

3,066,089
MECHANICAL HANDLING APPARATUS FOR LOADING AND UNLOADING HETEROGENEOUS NUCLEAR FUEL REACTORS
David Reginald Davies, Sale, England, assignor to Associated Electrical Industries (Manchester) Limited, a British company
Filed Sept. 10, 1957, Ser. No. 683,081
Claims priority, application Great Britain Sept. 12, 1956
5 Claims. (Cl. 204—193.2)

This invention relates to loading and unloading apparatus for nuclear reactors and more particularly to heterogeneous reactors of the kind in which the fuel is in the form of rod type elements arranged in vertical passages in the core.

Such types of reactors have a number of fuel channels distributed over the core, most of which channels are filled with fuel elements, and for the purpose of removing the used fuel elements and replacing them by fresh fuel elements it is necessary to provide loading and unloading apparatus including fuel carrier apparatus which must be capable of being in line with each of the active fuel channels in succession.

Such positioning must be effected to a reasonable degree of accuracy, and both the positioning and operation must be effected by remote control for obvious safety reasons.

The main object of the invention is to provide improved loading and unloading apparatus for reactors of the kind above referred to.

According to the present invention a reactor of the kind referred to is provided with a loading structure situated in the core chamber below the core and rotatable about a vertical axis, at least one horizontal radial passage leading to said core chamber and aligned with the loading structure, means for moving a fuel carrier from the passage on to the loading structure or vice versa and for positioning the fuel carrier thereon by a selected radial distance from the axis, means for rotating the loading structure so that the fuel carrier is also located at a selected angular position and means for actuating the carrier to load elements therefrom into a core fuel passage located immediately above or alternatively to unload fuel elements in a core passage to the carrier, as the case may be.

Preferably there is provided an actuating structure comprising one or more radial actuating arms rotatable about the same axis as the loading structure and located immediately below the loading structure which arms when rotated actuate the fuel carrier to inject fuel elements into the core or to receive fuel elements from the core.

The fuel carrier may conveniently be of the kind described in co-pending application Serial No. 683,082, filed September 10, 1957, now abandoned.

The loading structure and the actuating structure may be provided with annular racks engaged by pinion wheels mounted on shafts extending radially through the surrounding screening wall and operated by external means such as electric motors located outside the screen. Means may be provided for indicating externally the position of the loading structure and the drive may conveniently be of the positional type to enable accurate location of the structure to be obtained. Similar means may be provided for the actuating structure though in this case of course it is merely necessary to be able to predetermine the number of times that the fuel carrier is actuated during each sequence. The fuel carrier may conveniently be moved along a radial support, e.g. rails, which are aligned with rails in the loading and unloading passage when the structure is accurately positioned and movement of the fuel carrier may be effected by a rack. The actuation of such rack can be carried out and controlled conveniently by servo apparatus of the positional type ensuring accurate radial location of the rack and with external indicators so that the operator may at all times know the actual position of the fuel carrier.

In order that the invention may be more clearly understood reference will now be made to the accompanying drawings, in which:

FIG. 3 is a plan view.

FIG. 4 is a pictorial view of indicating apparatus, and

Figure 1:
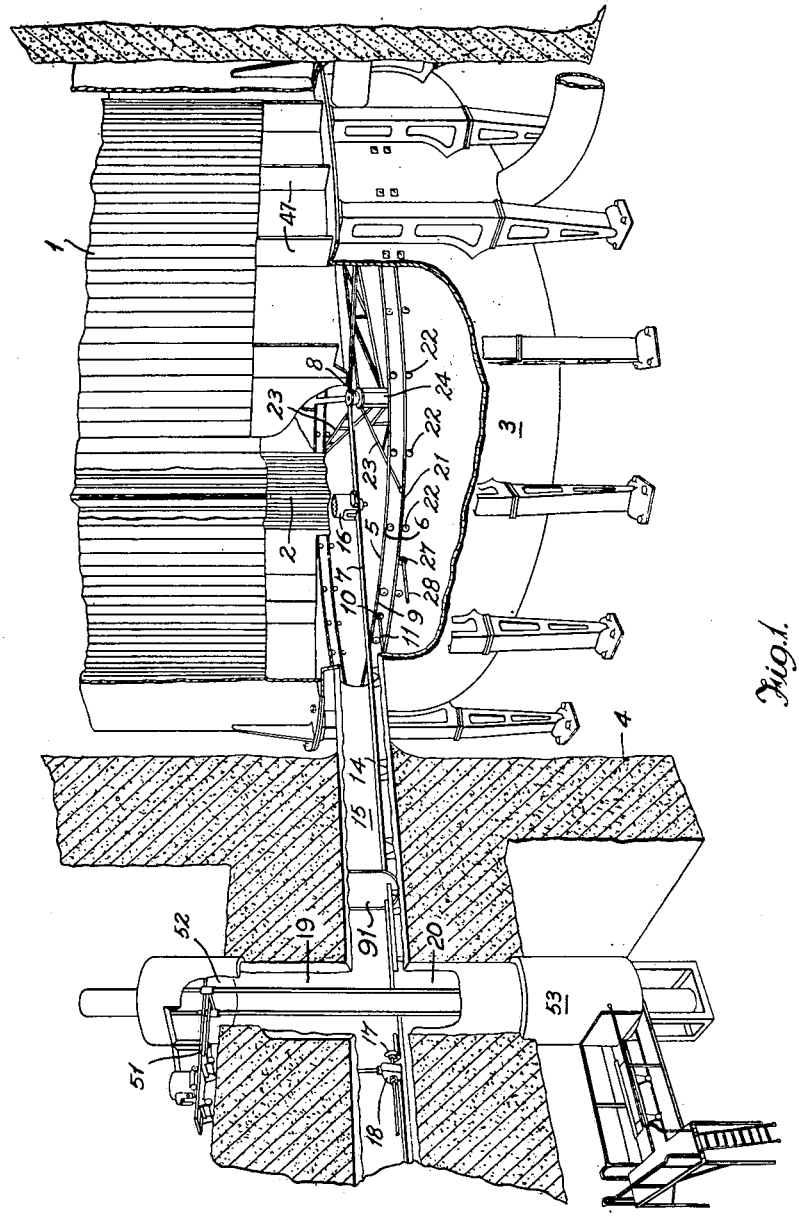
FIG. 1 is a pictorial view of the loading and unloading apparatus.

In FIG. 1 the reference 1 generally indicates the reactor core which is provided with a number of vertical fuel passages 2. It is assumed that the reactor is a gas cooled type and 3 represents the wall of the gas chamber and 4 the biological shield surrounding the reactor. The loading structure as shown essentially comprises an annular ring member 5 running on supporting rollers 6 distributed around the reactor chamber and suitably supported thereon. Three sets of carrier arms 7 extend radially outwards from a central hub 8 to the ring member 5. The ring member 5 is also provided with a toothed rack 9 on the underface which is engaged by a pinion 10 mounted on the inner end of a spindle 11 which is secured to a spindle 12 extending outwards through the shielding 4 to an electric motor 12a (FIG. 3). The radial carrier arms 7 support radial guide rails 13 that can be moved into alignment with fixed guide rails 14 extending along a loading passage 15 so that a fuel carrier 16 may be moved out of the loading passage 15 onto a rail 13, the movement being effected by a ram 17 controlled by a rack mechanism 18. This mechanism may be driven by a positional drive so that during a loading operation the carrier 16 is moved off the rails 14 on to the rails 13 and then positioned along the rails 13 at a predetermined radial distance from the central axis having regard to the particular fuel channel which is to be loaded. The rack 9 is then driven from the motor 12a (FIGURE 3) so that the carrier 16 is rotated into the correct angular position for the selected fuel channel.

The arrangement of the rails 13 is shown more clearly in the plan view of FIG. 3 and it will be understood that in this case there are three loading passages 15 uniformly spaced around the reactor and with such an arrangement a fuel carrier would be loaded onto each of the carrier arms 7 and after positioning all three fuel carriers would be simultaneously actuated to inject fuel elements into respective fuel channels. Thus with this arrangement it may be possible to independently load three fuel channels simultaneously and each carrier will operate over one sector of the core.

Figure 2:
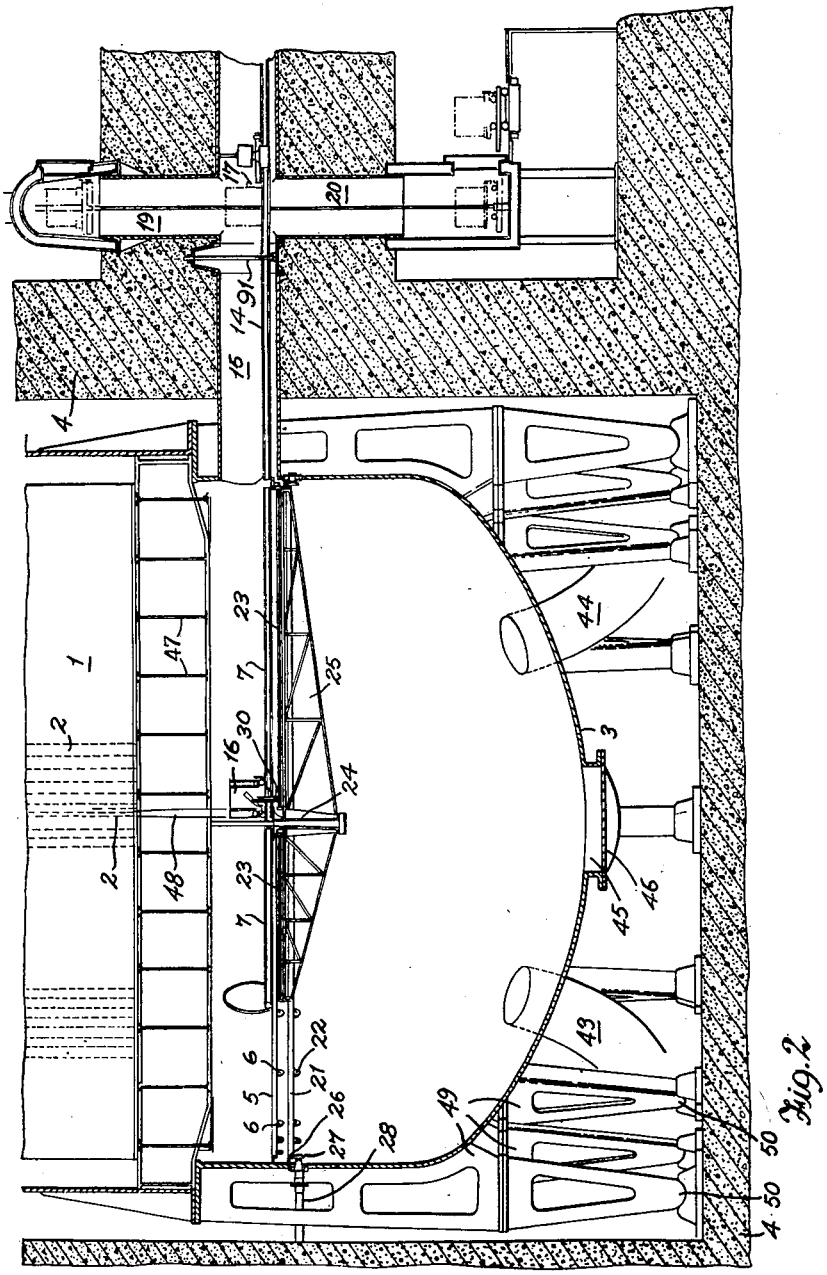
FIG. 2 is a sectional elevation of the apparatus shown in FIG. 1.
Figure 1A:
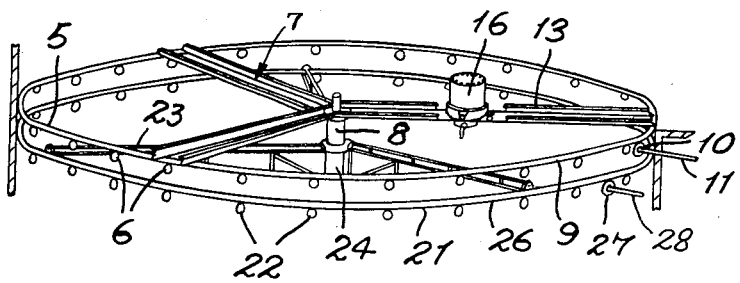
FIG. 1A is a pictorial view of part of the apparatus.
Figure 2A:
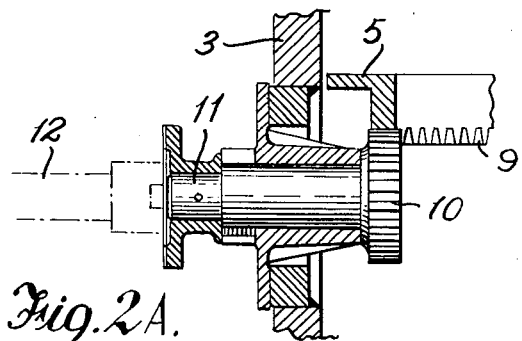
FIGURE 2A is an enlarged fragmentary sectional view showing the drive for the fuel carrying ring.
Figure 2B:
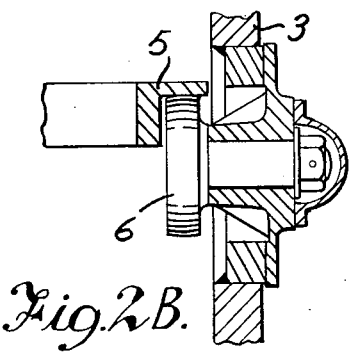
FIGURE 2B is an enlarged fragmentary sectional view showing the roller support of the fuel carrying ring.

As shown in FIG. 2 and also in FIG. 1, a vertical passage 19 extends upwardly from the horizontal passage 15 and a passage 20 extends vertically downwards. It is intended that the fuel carriers 16 shall be inserted into the upper part of the passage 19 and lowered onto the rails 14 at this position and carriers 16 containing used fuel elements may be discharged into the passage 20 and subsequently dealt with. The actuating structure comprises a ring 21 located immediately below the ring 5 of the supporting structure and similarly supported on rollers 22 which are suitably mounted on the reactor framework. The ring 21 is secured to the outer ends of three radial actuating arms 23 extending horizontally from a central hub 24 rotatable about the same vertical axis as the hub 8. Thus, the arms 23, ring 21 and hub 24 form a structure rotatable about a central vertical axis.

As shown more clearly in FIG. 2, the hub 24 extends downwardly below the level of the arms 23 and a structural framework 25 extends beneath the arms 23 in order to impart rigidity to the assembly. The ring 21 is also on the underside provided with a rack 26 engaged by a pinion 27 connected to a spindle 28 with an external driving motor 29 as shown in FIGURE 3. When the actuating assembly rotates, the arms 23, of which there are three, strike a member, e.g. the spokes of a sprocket or control wheel 30, on the underside of a fuel carrier 16 and rotate wheel 30 by a predetermined amount, e.g. it is contemplated that normally each fuel channel will be filled with a number of fuel elements in the form of rods one over the other and thus it might for example be arranged that each time an arm 23 passes the fuel carrier 16 the sprocket 30 is rotated a sufficient amount to load one of the full rods into the fuel passage.

Such an arrangement is described in said co-pending application Serial No. 683,082.

FIG. 4 is a pictorial view showing indicating apparatus which may be employed to indicate in a control room the position of the fuel carrier. The indicating apparatus shown provides for control of two reactors, referred to as No. 1 and No. 2.

Referring to the indicator for No. 1 reactor, this comprises three sets of rails 31, 32 and 33 corresponding to the loading passage 15 above referred to and carrier indicators 34, 35 and 36 respectively representing the fuel carriers. The position of these indicators at all times corresponds to that of the fuel carriers and during the loading operation the indicators 34, 35 and 36 are moved respectively on to the aligned rails 37, 38 and 39. When the arms 7 in the reactor are rotated the arms 37, 38 and 39 follow their movement.

Thus at all times the operator can observe the fuel passage in the reactor with which he is dealing.

In addition three sets of arms 40, 41 and 42 represent the actuating arms 23 and their positioning corresponds. In addition indicators may be provided for indicating the number of times that the loading apparatus has been actuated so that the operator knows how many fuel elements were loaded or unloaded from the core, as the case may be.

The indicators are positioned from the reactor operating apparatus through suitable servo links.

The reactor shown is designed for gas cooling through ducts of which two ducts 43 and 44 are shown.

An opening 45 closed by a cover plate 46 is provided at the base of the gas chamber wall 3 for removal of any fuel elements which are dropped.

The reactor core is supported in a lattice structure 47 of girders and fuel passages 48 are threaded between the girders for feeding fuel elements from the fuel loader 16 into the reactor core fuel passages. The gas chamber 3 is mounted on supports 49 distributed around the chamber wall having feet 50 which are arranged to rock slightly to allow for thermal expansion of the gas chamber.

The fuel carriers, loaded with fresh fuel, are intended to be fed on rails 51, into a loading chamber 52 at the top of passage 19 whence the rails are lowered until they are aligned with the rails 14 so that the fuel carrier can be moved into the space underneath the reactor core 1.

Similarly fuel carriers loaded with used fuel would be lowered into a discharge chamber 53 at the bottom of passage 20 where they would be enclosed in a coffin and then removed for processing.

Figure 5:
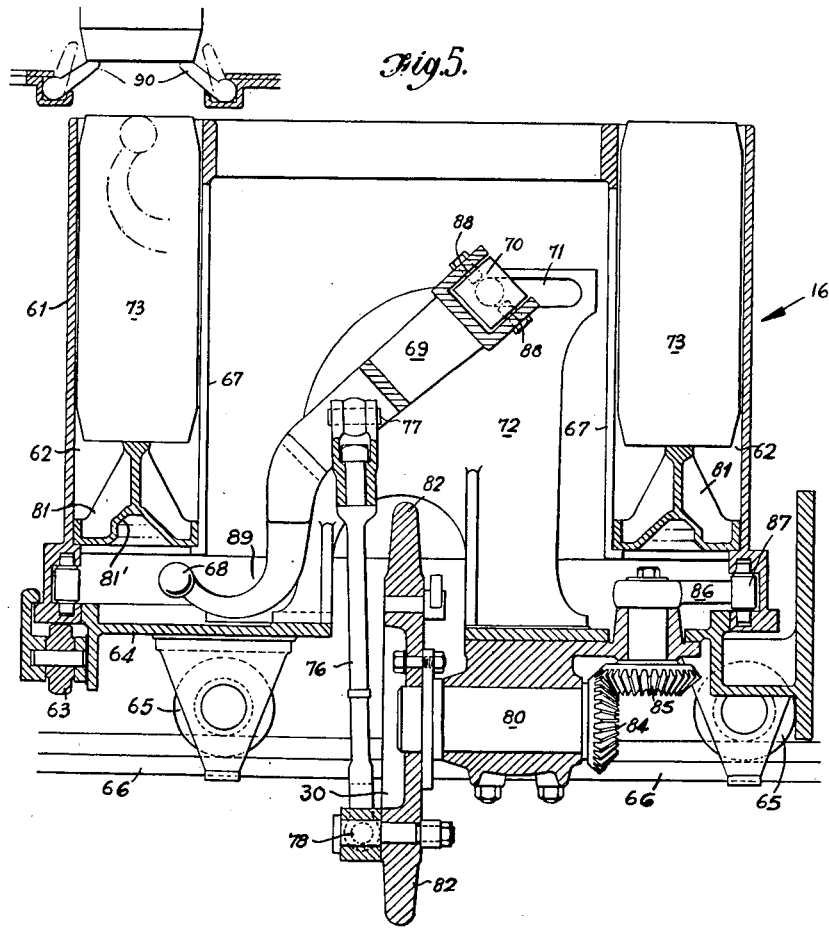
FIG. 5 shows one form of fuel carrier which may be employed.

The fuel carrier 16 shown in FIG. 5 essentially comprises a vertical cylindrical body structure 61 having a number of circumferentially distributed vertical passages 62 constituting supports for housing the fuel elements. The structure 61 rests on a series of rollers 63 mounted on a base structure 64 which in turn rests on rollers 65 running on rails 66 which are themselves movable. The fuel carrier may be located by positioning the carrier on the rails and by positioning the rails. The fuel support passages 62 are arranged on a pitch circle about the axis of rotation of the fuel carrier body 61 and each, as above mentioned, is tubular and is formed on the inside with a vertical slot 67 through which the nose 68 of the loading arm 69 projects radially outwards. This loading arm is pivoted about a bearing block 70 which is slidable in a slot 71 mounted on the top of a bracket 72.

In FIG. 5 the loading arm 69 is shown in the lowered position and it can be raised into the position shown in chain dotted lines; it is adapted to lift a fuel element 73 from a support passage 62 into the passage 2 in the reactor core underneath which the fuel carrier is located. The pivotal movement of the loading arm 69 is effected through a connecting rod 76 which is pivoted at 77 to the loading arm 69 and at 78 is pivoted eccentrically to control wheel 30. Control wheel 30 is fixed on a shaft 80 rotatably mounted in the lower end of bracket 72 (FIGURE 5) and is formed with uniformly spaced radial spokes 82. Spokes 82 are engaged in sequence by arms 23 of the rotating actuating assembly above described and shown in FIGURE 3, mechanism 23 being disposed beneath the fuel carrier 16.

Each time control wheel 30 is engaged and rotated by an arm 23 wheel 30 is roated through $\pi/3$ radians and loading arm 69 (FIGURE 5) is moved a corresponding amount about its pivot. It will be noted that there are six spokes 82 so that wheel 30 must rotate through $\pi$ radians, i.e. three spokes 82 must be engaged and wheel 30 rotated thereby to raise loading arm 69 fully. The wheel 30 must rotate a similar amount to fully lower arm 69. When all six spokes have been moved in sequence the wheel 30 will have made a complete revolution about its axis i.e. $2\pi$ radians, and loading arm 69 will have performed one cycle of up and down movement.

At the same time the shaft 80 to which the wheel 30 is secured operates through bevel gears 84 and 85. Gear 85 is mounted on an arm 86 which rotates about a vertical axis and in so doing abuts against a series of rollers 87 distributed around the periphery of the base of the structure 61 and this rotates the structure a unit amount each time the control wheel 30 makes one complete revolution thereby producing a step by step rotational movement of the structure so as to bring the next fuel support in alignment with the fuel channel in the reactor core.

It will be appreciated that provision must be made for the fact that the rotational movement of the carrier will occur before the loading arm has completed its cycle of movement, in other words, whilst it is still in one of the passages 62 and to permit this to occur the arm 69 is pivoted to the bearing block 70 by trunnions 88 which permit a certain amount of sideway rocking of the arm 69; at the same time a cam surface 89 deflects the nose 68 of the arm 69 sideways during the last part of its downward movement so that when it finally comes to rest it will be positioned underneath the next fuel rod to be raised.

There are a number of fuel elements in alignment and at the bottom of the stack there would normally be several dummy elements, i.e. in the part of the approach channel which passes through the supporting structure for the core.

When the fuel rods are raised into the core passage 2 immediately thereabove they are prevented from falling down by pawls 90 and thus they can be inserted one at a time, each element inserted pushing up the others. During a loading operation the nose 68 of the loading arm abuts against the underside of a piston 81 which moves up the passage 73 and lifts the fuel element.

The underside of the piston is formed with a recess 81' into which the nose 68 of the loading arm fits.

During unloading the piston 81 is replaced by a piston designed to push the pawls 90 apart so that when the piston is lowered the fuel element is pulled down.

For a fuller description of the fuel carrier reference may be made to said co-pending application Serial No. 683,082.

During loading and unloading operations it will normally be necessary to lower the gas pressure to avoid escape of coolant. Normally the passage 15 in FIGURE 1 will be sealed by a closure 91 whilst a second similar closure may be provided to form a gas lock.

What I claim is:

1. Fuel handling apparatus for a nuclear reactor of the type having a moderator core, vertical fuel passages to said core and fuel charging openings at the lower ends of said fuel passages comprising a loading structure adapted to be situated below the core and rotatable about a vertical axis, means mounting a fuel carrier on the loading structure, means for shifting said fuel carrier along said loading structure for locating it at a radial distance from the axis of rotation corresponding to a selected fuel passage, means for rotating the loading structure so that the fuel carrier is also located at an angular position corresponding to a selected fuel passage and means for actuating the carrier to transfer fuel elements between the fuel carrier and selected fuel passage, said actuating structure comprising at least one radial horizontal arm rotatable about the same vertical axis as the loading structure and a control member rotatably mounted on the fuel carrier for actuating a loading arm for said carrier, said control member having means engaged by said horizontal radial arm so as to be periodically rotated thereby during rotation of said loading structure.

2. Fuel handling apparatus for a nuclear reactor of the type having a moderator core, vertical fuel passages to said core and fuel charging openings at the lower ends of said fuel passages and arranged to be loaded by a fuel carrier of the type which loads a selected one of said vertical fuel passages at a time, said fuel handling apparatus comprising a loading structure having a plurality of radially extending rails situated below the core and rotatable about a vertical axis, means mounting said fuel carrier for movement along said rails, means for shifting said fuel carrier along said loading structure for locating it at a radial distance from the axis of rotation in a pitch circle passing approximately through the center of a selected vertical fuel passage, means for then rotating the loading structure so that the fuel carrier is located at an angular position directly beneath said selected vertical fuel passage, and means for actuating said fuel carrier to transfer fuel elements between the fuel carrier and selected vertical fuel passage comprising elevator mechanism on said fuel carrier and control means operable independently of said means for rotating the loading structure actuated from a point externally of said loading structure for operating said elevating mechanism in any selected angularly and radially displaced position of said carrier on said rails.

3. Fuel handling apparatus for a nuclear reactor of the type having a moderator core, vertical fuel passages to said core and fuel charging openings at the lower ends of said fuel passages and arranged to be loaded by a fuel carrier of the type which loads a selected one of said vertical fuel passages at a time, said fuel handling apparatus comprising a loading structure having a plurality of radially extending rails situated below the core and rotatable about a vertical axis, a pressure vessel enclosing said core and loading structure, said vessel having an opening, means for mounting said fuel carrier on the loading structure, means for moving a fuel carrier from a point outside the pressure vessel through said opening onto said loading structure, means for shifting the fuel carrier along said loading structure for locating it thereon at a radial distance from the axis of rotation in a pitch circle passing approximately through the center of a selected vertical fuel passage, means for then rotating the loading structure so that the fuel carrier is located at an angular position directly beneath said selected vertical fuel passage, and means for actuating said fuel carrier to transfer fuel elements between the fuel carrier and selected vertical fuel passage comprising elevator mechanism on said fuel carrier and control means operable independently of said means for rotating the loading structure actuated from a point externally of said loading structure for operating said elevating mechanism in any selected angularly and radially displaced position of said carrier on said rails.

4. Fuel handling apparatus for a nuclear reactor of the type having a moderator core, vertical fuel passages to said core and fuel passages charging openings at the lower ends of said fuel and arranged to be loaded by a fuel carrier of the type which loads a selected one of said vertical fuel passages at a time, said fuel handling apparatus comprising a loading structure having a plurality of radially extending rails situated below the core and rotatable about a vertical axis, an annular member on which said loading structure is mounted, means mounting said fuel carrier for movement along said rails, means for shifting said fuel carrier along said loading structure for locating it at a radial distance from the axis of rotation in a pitch circle passing approximately through the center of a selected vertical fuel passage, means for then rotating said annular member so that the fuel carrier is located at an angular position directly beneath said selected vertical fuel passage, and means for actuating said fuel carrier to transfer fuel elements between the fuel carrier and selected vertical fuel passage comprising elevator mechanism on said fuel carrier and rotatable means operable independently of said means for rotating the loading structure for operating said elevating mechanism in any selected angularly and radially displaced position of said carrier on said rails, said rotatable means comprising a member rotatable about said vertical axis and said member being connected to cyclically actuate said elevator mechanism during rotation of said member.

5. Fuel handling apparatus for a nuclear reactor comprising a loading structure mounted for rotation on a vertical axis and having a plurality of substantially radially extending rails, a fuel carrier mounted for movement along each of said rails, means for rotating said loading structure about its axis, means for shifting each said fuel carrier independently along its mounting rail, each of said fuel carriers having a fuel element elevating device, and means for simultaneously actuating each of said devices regardless of the relative radial positions of said fuel carriers.

References Cited in the file of this patent

UNITED STATES PATENTS 2,756,858    Kasschau  ---------------- July 31, 1956
2,780,596    Anderson  ---------------- Feb. 5, 1957